United States Patent [19]

Tsunetomi et al.

[11] 4,387,680
[45] Jun. 14, 1983

[54] MECHANISM FOR STOPPING VALVE OPERATION

[76] Inventors: Katashi Tsunetomi; Akira Takahashi; Katsuyuki Tsuji, all of Kyoto, Japan

[21] Appl. No.: 256,024

[22] Filed: Apr. 21, 1981

[30] Foreign Application Priority Data

Apr. 23, 1980 [JP] Japan .................................. 55-52837
Nov. 11, 1980 [JP] Japan ................................. 55-160741
Nov. 14, 1980 [JP] Japan ................................. 55-159402

[51] Int. Cl.³ ............................................. F02D 13/06
[52] U.S. Cl. .............................. 123/198 F; 123/90.15
[58] Field of Search ............. 123/198 F, 90.15, 90.16, 123/90.17, 90.27, 90.28, 90.29, 90.42, 90.43

[56] References Cited

U.S. PATENT DOCUMENTS

| | | | |
|---|---|---|---|
| 1,977,778 | 10/1934 | Rice | 123/198 F |
| 1,985,447 | 12/1934 | Grubbs | 123/198 F |
| 3,520,287 | 7/1970 | Calvin | 123/198 F |
| 4,050,435 | 9/1977 | Fuller, Jr. et al. | 123/198 F |
| 4,061,123 | 12/1977 | Janes | 123/198 F |
| 4,114,588 | 9/1978 | Jordan | 123/198 F |
| 4,213,442 | 7/1980 | Mihalic | 123/198 F |
| 4,252,093 | 2/1981 | Hazelrigg | 123/198 F |

Primary Examiner—Wendell E. Burns
Attorney, Agent, or Firm—Oldham, Oldham, Hudak, Weber & Sand Co.

[57] ABSTRACT

A mechanism for stopping operation of a valve, comprising a plunger slidably mounted in a portion of a valve actuating system for actuating the valve, a stopper engageable and disengageable with the plunger to prevent or allow sliding motion of the plunger thereby operating or stopping the valve, and controlling means detecting phases of a valve actuating cam and operating an actuator for actuating the stopper in response to the detected phases, whereby the plunger and the stopper are engaged and disengaged always immediately after a lift of the cam ends.

12 Claims, 31 Drawing Figures

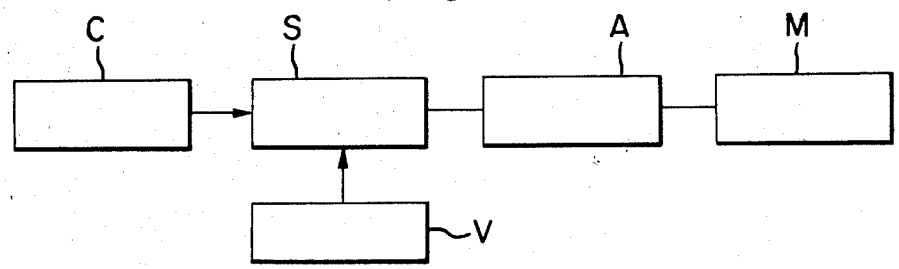
FIG. 1
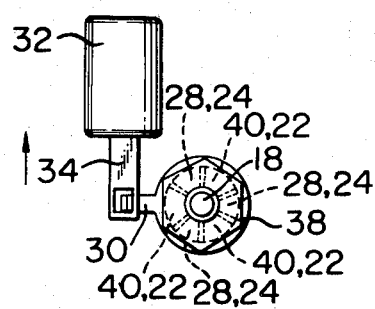
FIG. 2-a
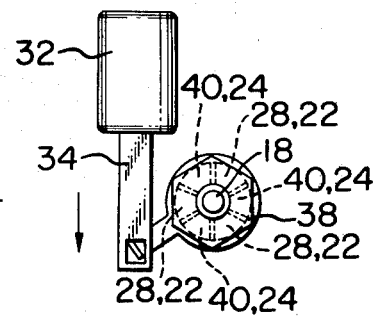
FIG. 3-a
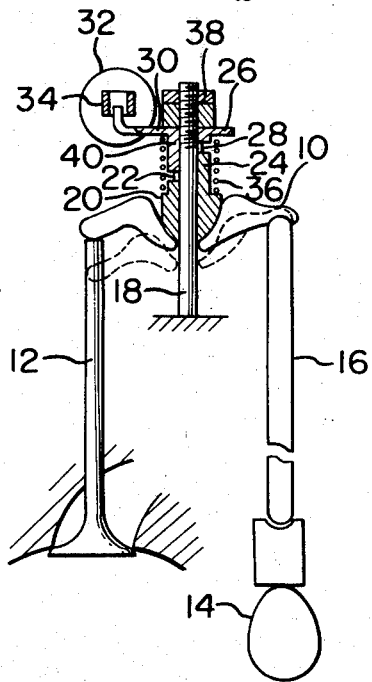
FIG. 2-b
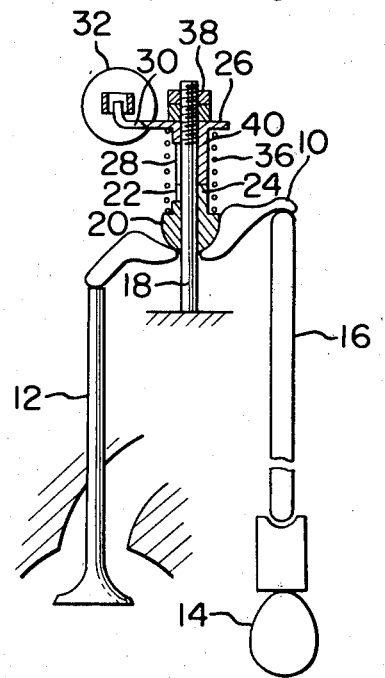
FIG. 3-b FIG. 4-a
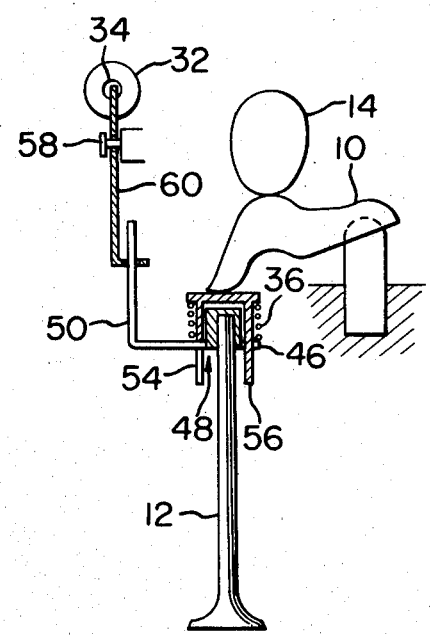
FIG. 4-b
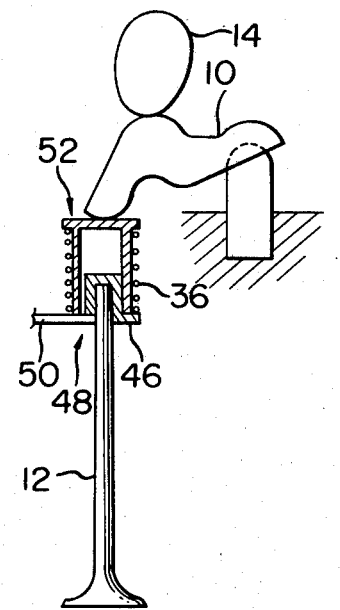
FIG. 4-c
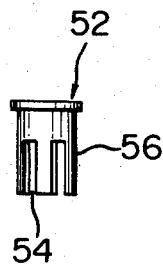
FIG. 4-d
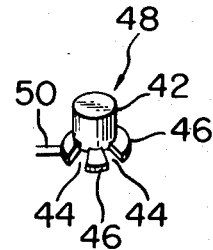

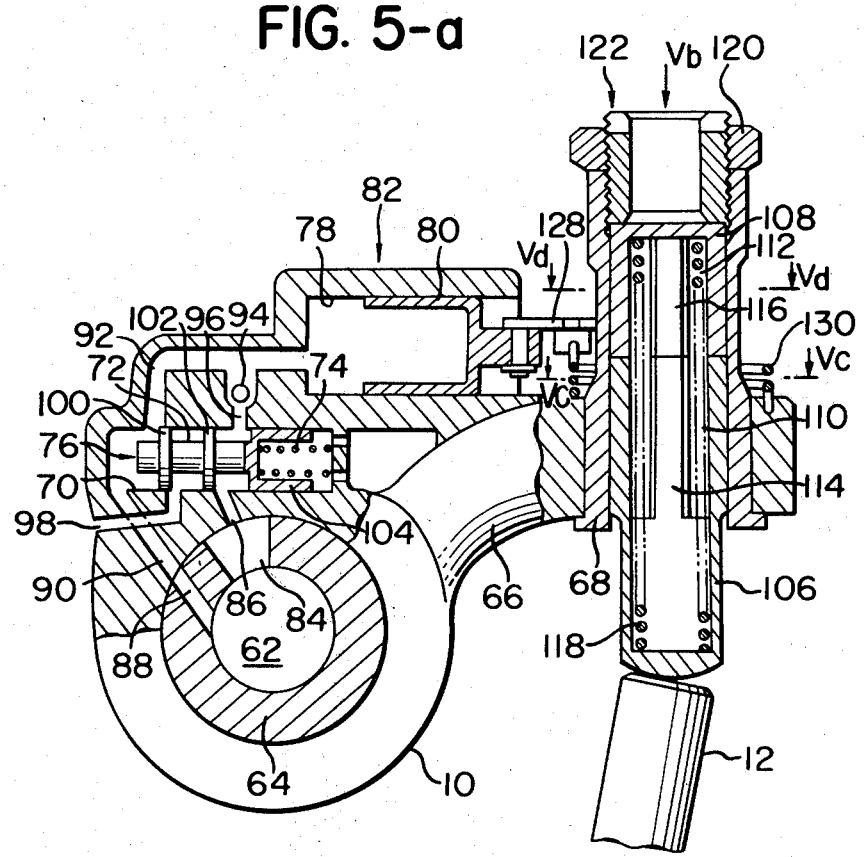
FIG. 5-a
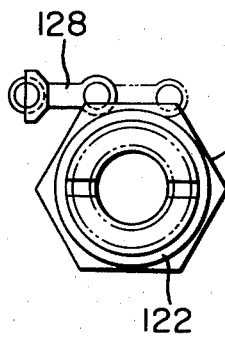
FIG. 5-b
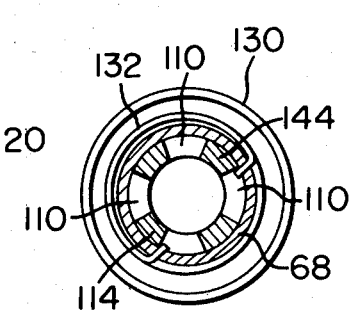
FIG. 5-c
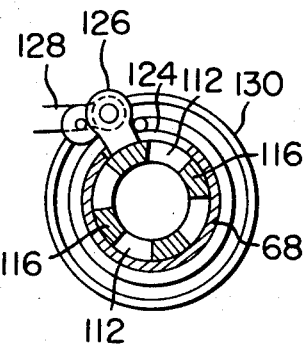
FIG. 5-d

FIG. 6-a
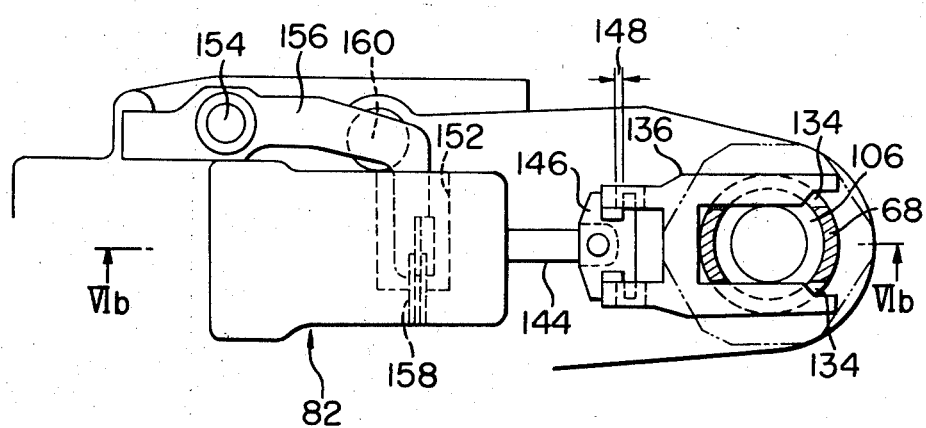
FIG. 6-b
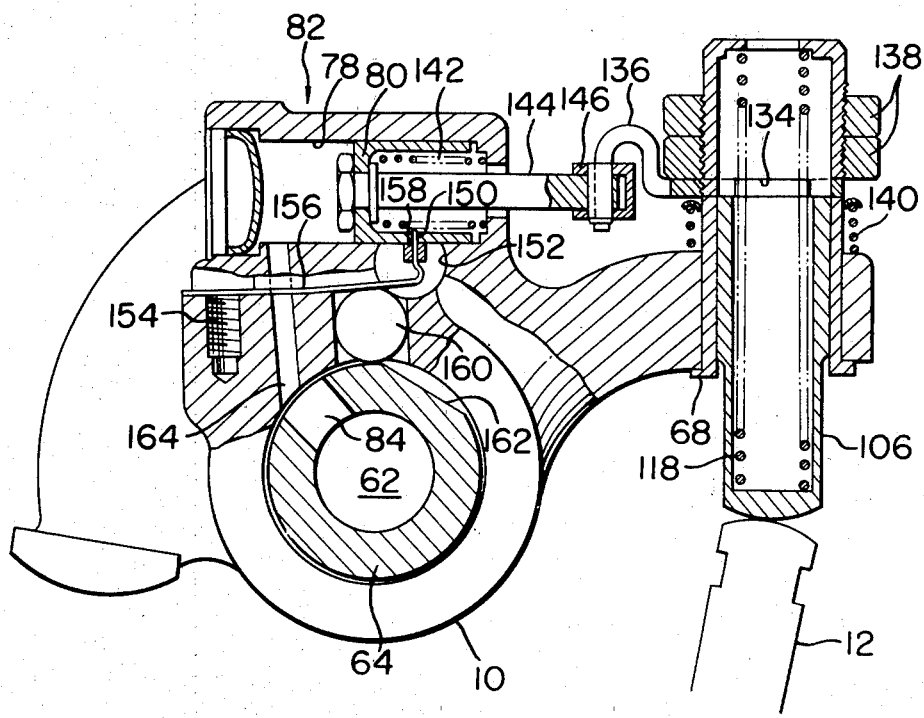

FIG. 6-c
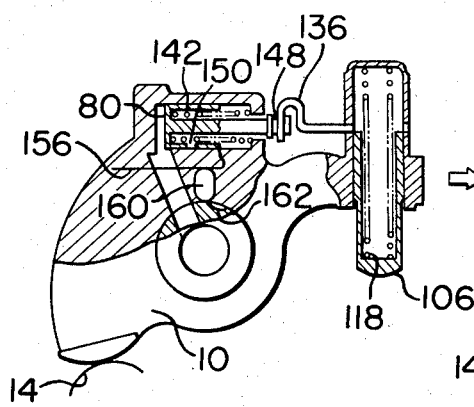
FIG. 6-d
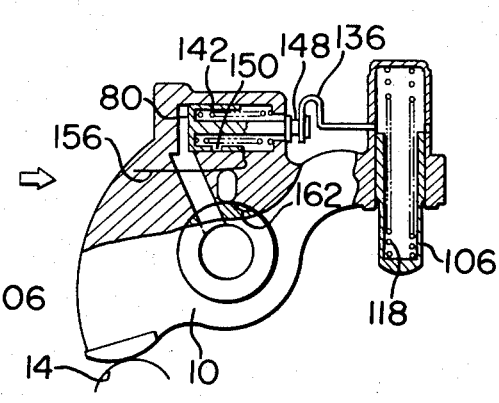
FIG. 6-f
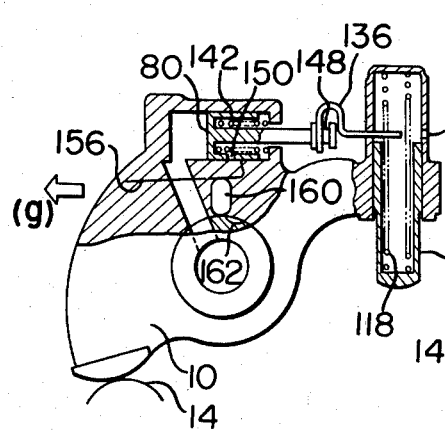
FIG. 6-e
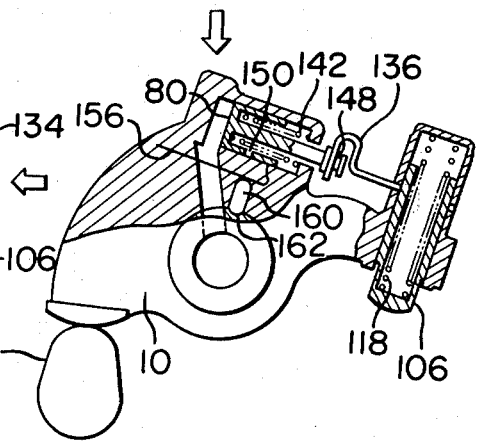

FIG. 6-g
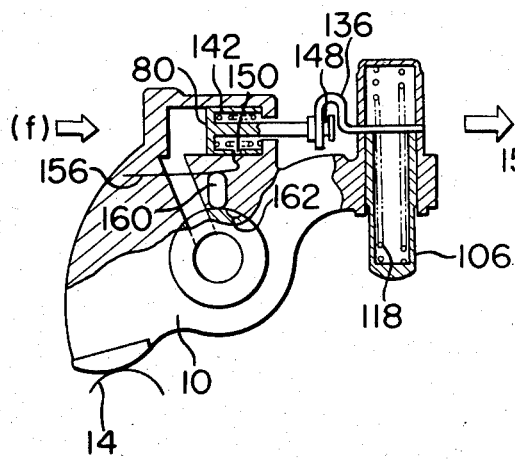
FIG. 6-h
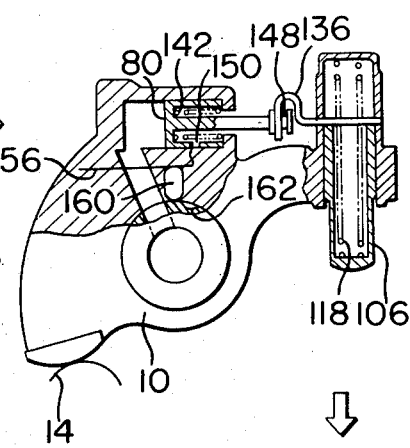
FIG. 6-j
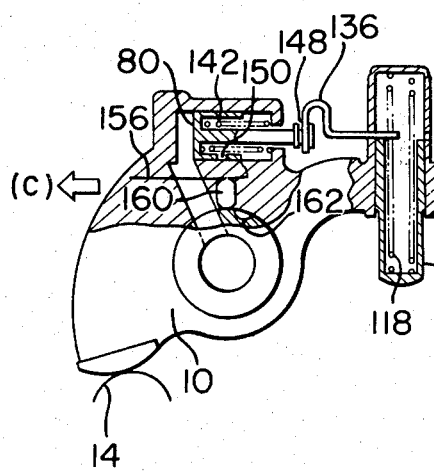
FIG. 6-i
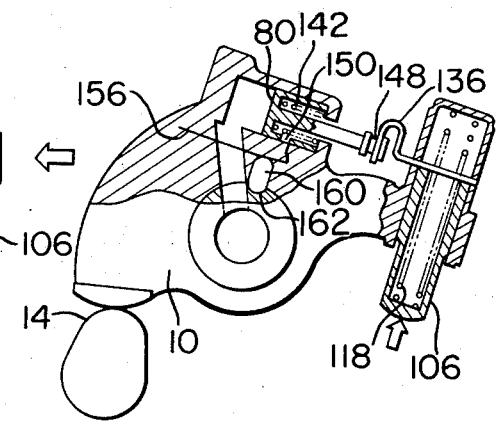

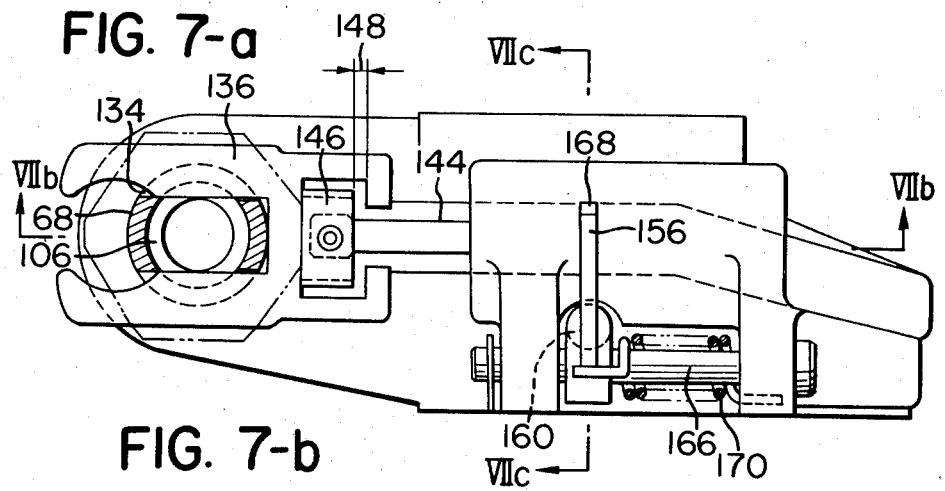
FIG. 7-a
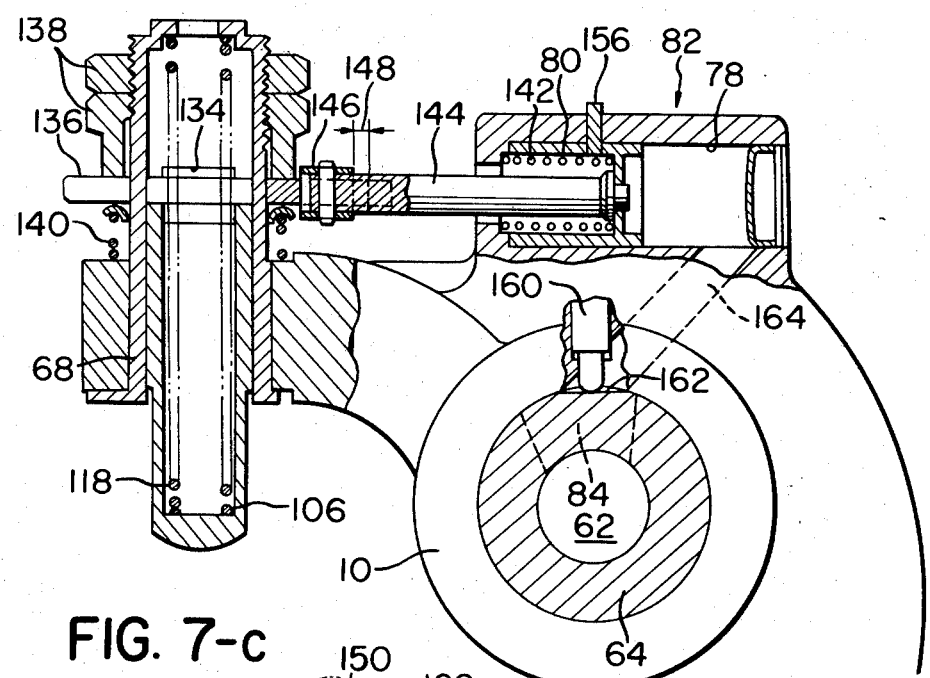
FIG. 7-b
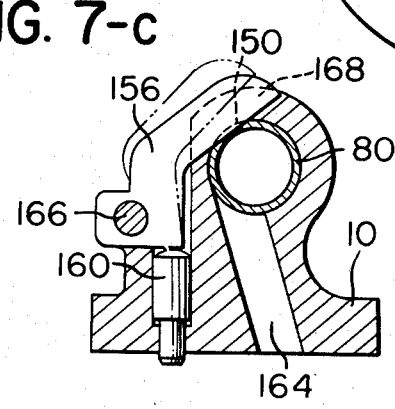
FIG. 7-c

FIG. 8-a
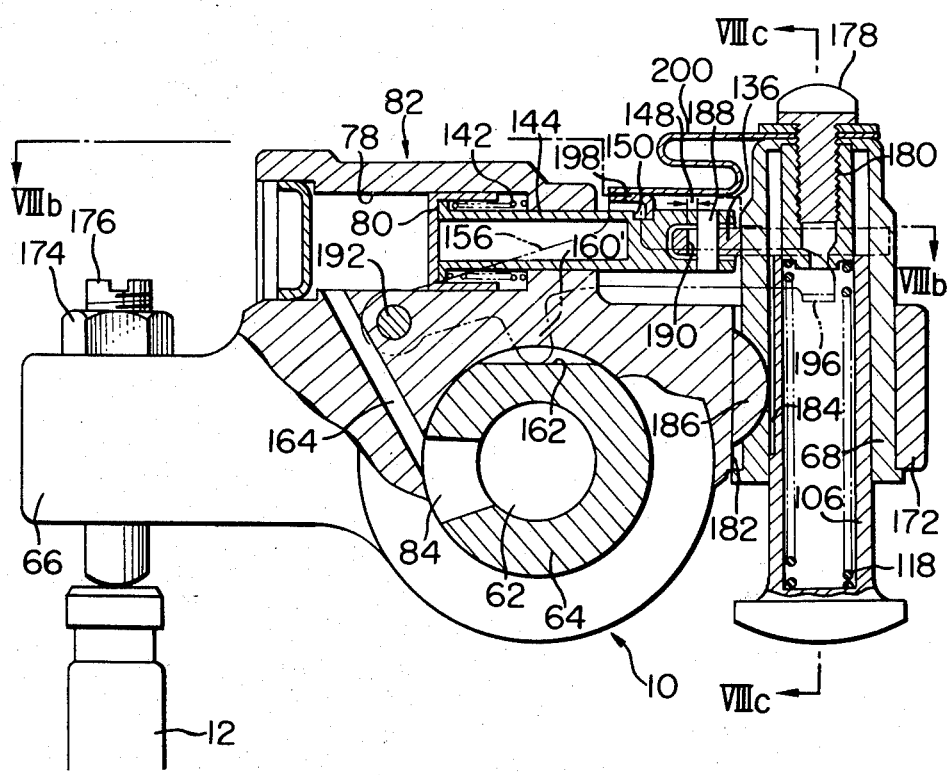
FIG. 8-b
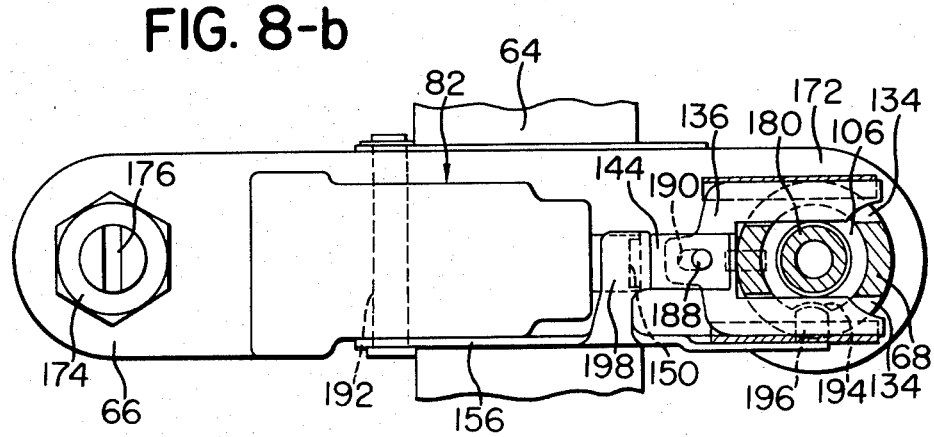

FIG. 8-c
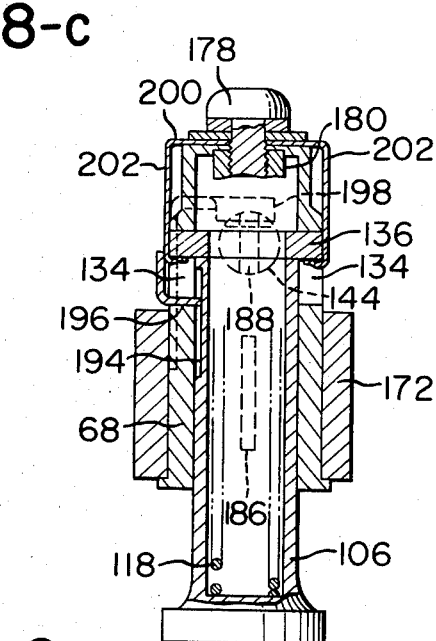
FIG. 9
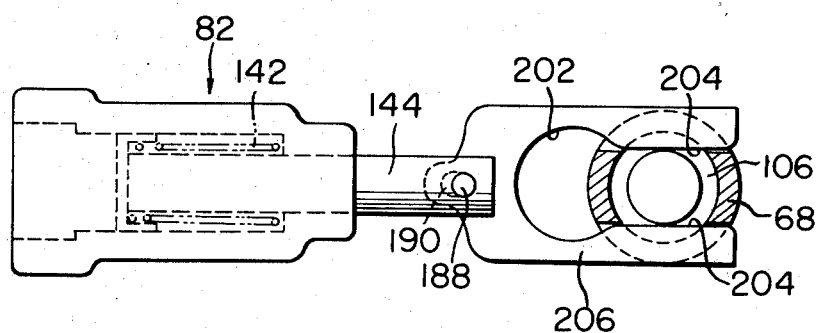
FIG. 10
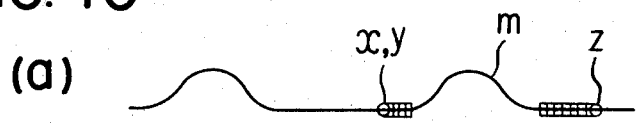
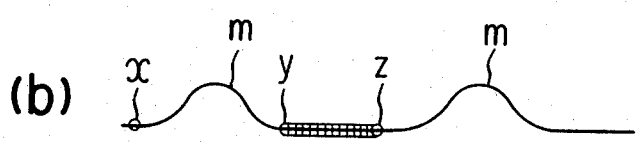

MECHANISM FOR STOPPING VALVE OPERATION

BACKGROUND OF THE INVENTION

This invention relates to a mechanism for stopping operation of a poppet valve which is used as an intake valve, an exhaust valave or the like in an internal combustion engine in particular.

As one example, there is an internal combustion engine provided with two (primary and secondary) intake valves in one cylinder, in which during low-loaded or medium-loaded driving range of the engine, only the primary intake valve is operated, having the secondary intake valve stopped, and during high-loaded during range of the engine, both the primary valve and the secondary valve are operated to increase the output of the engine. Also, in a multi-cylinder internal combustion engine, it is proposed to control operation of the intake and exhaust valves according to the driving conditions of the engine, namely, during idling or low-loaded driving range where operation of all the cylinders are not necessarily required, the intake and exhaust valves of some of the cylinders are stopped to rest said cylinders, thereby reducing fuel consumption, and during high-loaded driving range, all the intake and exhaust valves are operated to activate all the cylinders.

As one example of a mechanism for stopping operation of the valve, it is proposed to define a clearance in a part of a valve actuating system and a solid stopper is moved into and out of the clearance to mechanically stop operation of the valve. This mechanism has advantages in that by moving said stopper in a direction substantially perpendicular to the operating direction of the valve, any imperfect lift of the valve can be prevented and that said stopper can be moved into and out of the clearance only when a lift of a cam for actuating said valve is in a zero range.

However, there is a disadvantage in that if said stopper is moved into and out of the clearance at the nearest point to a start of the cam lift in the zero range, a valve lift might be started before the stopper is completely moved into or out of the clearance and an excessively high stress may be imposed on a part of the stopper, causing breakage of the stopper and generation of noise.

SUMMARY OF THE INVENTION

In view of the abovedescribed inconveniences, the present invention provides a mechanism for stopping operation of a valve comprising a plunger slidably mounted in a portion of valve actuating system for actuating the valve used as an intake valve, an exhaust valve or the like of an internal combustion engine, a stopper engageable and disengageable with said plunger and an actuator for actuating said stopper, said stopper being engaged with said plunger to prevent sliding motion of the plunger thereby operating said valve, said stopper being disengaged from said plunger to allow sliding motion of the plunger thereby stopping the operation of said valve, and controlling means detecting phases of a valve actuating cam for actuating said valve and operating said actuator in response to the detected phases.

According to the abovementioned construction, as the actuator for actuating the stopper is operated in synchronism with the phases of the valve actuating cam, an signal for operating said actuator can be generated at the time during the cam lift by the valve actuating cam or just after the end of the cam lift, that is, the first part of the zero range of the cam lift, and the abovementioned defects can be eliminated.

BRIEF DESCRIPTION OF THE DRAWINGS

This invention will now be explained by way of example with reference to the accompanying drawings in which:

FIG. 1 is a block diagram showing the general construction of a mechanism for stopping operation of a valve according to this invention, FIG. 2-*a* is a plan view showing the first embodiment of said mechanism when the valve is stopped, FIG. 2-*b* is a sectional view of the mechanism in FIG. 2-*a*, FIG. 3-*a* is a plan view of said mechanism when the valve is operated, FIG. 3-*b* is a sectional view of the mechanism in FIG. 3-*a*, FIG. 4-*a* is a sectional view showing the second embodiment of said mechanism when the valve is stopped, FIG. 4-*b* is a sectional view of the mechanism in FIG. 4-*a* when the valve is operated, FIG. 4-*c* is a side view of the plunger in FIGS. 4-*a* and 4-*b*, FIG. 4-*d* is a perspective view of the stopper in FIGS. 4-*a* and 4-*b*, FIG. 5-*a* is a sectional view showing the third embodiment of said mechanism, FIG. 5-*b* is a partial plan view seeing in the direction of the arrow V*b* in FIG. 5-*a*, FIG. 5-*c* is a sectional view along the line V*c*—V*c* FIG. 5-*a*, FIG. 5-*d* is a sectional view along the line V*d*—V*d* in FIG. 5-*a*, FIG. 6-*a* is a plan view showing partially in section of the fourth embodiment of said mechanism, FIG. 6-*b* is a sectional view along the line VI*b*—VI*b* in FIG. 6-*a*, FIG. 6-*c* to FIG. 6-*j* are explanatory drawings of the operation of the mechanism in FIGS. 6-*a* and 6-*b*, FIG. 7-*a* is a plan view showing partially in section of the fifth embodiment of said mechanism, FIG. 7-*b* is a sectional view along the line VII*b*—VII*b* in FIG. 7-*a*, FIG. 7-*c* is a sectional view along the line VII*c*—VII*c* in FIG. 7-*a*, FIG. 8-*a* is a sectional view showing the sixth embodiment of said mechanism, FIG. 8-*b* is a sectional view along the line VIII*b*—VIII*b* in FIG. 8-*a*, FIG. 8-*c* is a sectional view along the line VIII*c*—VIII*c* in FIG. 8-*a*, FIG. 9 is a partial plan view of an essential part of the mechanism showing a modification of said fourth to sixth embodiments, and FIG. 10 is an explanatory drawing showing the operational characteristics of a mechanism for stopping operation of a valve according to the prior art and of the mechanism according to the present invention.

DESCRIPTION OF THE PREFERRED EMBODIMENTS

A first embodiment of the mechanism for stopping operation of the valve will be explained with reference to FIGS. 1 to 3.

FIG. 1 shows a positional relation between a cam phase detecting device C for detecting the phase of a valve actuating cam for actuating the valve and generating a signal during a lift of the cam or just after the end of the cam lift, valve controlling means V for generating a signal for controlling operation and stoppage of the valve according to the operating condition of the engine, a synchronizing device S for controlling supply of electrical actuating current to the actuator A in synchronism with the signal from said cam phase detecting device C after having received the signal from the valve controlling means V and a valve stopping device (stopper) M operating by said actuator A.

Referring to FIGS. 2 and 3 showing a detail construction of the actuator A and the valve stopping device M in FIG. 1, a rocker arm 10 forms a part of a valve actuating system for actuating a poppet valve 12 used as an intake or exhaust valve of an internal combustion engine. One end of said rocker arm abuts on the end of a stem of the poppet valve 12 and the other end abuts on the upper end of a push rod 16 which is moved upward and downward by means of a valve actuating cam 14 rotatable in synchronism with a crankshaft of said engine thereby causing a rocking movement of the rocker arm 10. The center portion of the rocker arm 12 abuts on the bottom end of a plunger 20 slidably fitted on a stud 18. Said bottom end of the plunger 20 is formed in a semispherical configuration to define a spherical seat and pivotally supports the rocker arm 10, and a plurality of (three in this embodiment) projections 24 are formed on the upper part of the plunger 20 with spaces 22 of a equal width along the periphery of the stud 18. A substantially cylindrical stopper 26 is rotatably fitted on the stud 18 above the plunger 20, and channels 28 mating with said projections 24 of the plunger 20 are formed in an axial direction and equally spaced circumferentially along the wall on the lower half of the stopper 26. A lever 30 is provided on the upper end of the stopper 26 and extends radially therefrom. The end of the lever 30 is engaged with the end of a plunger 34 of an electromagnetic actuator 32 so that said stopper 26 is rotated by means of the plunger 34 which is reciprocated by energization and de-energization of an electromagnetic coil of the actuator 32. A spring 36 is interposed between the plunger 20 and the stopper 26, and a lock nut 38 is threaded on the stud 28 above the stopper 26 for concurrently positioning and preventing disengagement. Further, said plunger 20 is prevented its rotation about the stud 18 by a detent (not shown). When the stopper 26 takes the position in relation to the plunger 20 as shown in FIGS. 2-a and 2-b, namely the position in which the channels 28 of the stopper 26 and the projections 24 of the plunger 20 are engageable to each other and the wall portions 40 of the stopper 26 between two adjacent channels 28 and spaces 22 of the plunger 20 are engageable to each other, the plunger 20 becomes slidable upward and downward. When the stopper 26 takes the position as shown in FIGS. 3-a and 3-b, namely the position in which the channels 28 of the stopper 26 and spaces 22 of the plunger 20 are opposed and the lower ends of the wall portions 40 of the stopper 26 and the upper ends of the projections 24 of the plunger 20 abut with each other, sliding motion of the plunger 20 is prevented. When the lift of the push rod 16 by the valve actuating cam 14 (or the cam lift) is zero, the stopper 26 becomes rotatable as the stopper is disengaged from the plunger 20 or as a spring load, which is imposed on the stopper by a valve spring (not shown) for closing the poppet valve 12 when the projections 24 and the wall portions 40 abut with each other, is lessened.

In operation, when a valve stopping signal for stopping opening and closing operation of the poppet valve 12 is generated by the valve controlling means V, according to the driving condition of the engine, regardless of the phase of the valve actuating cam, the synchronizing device S supplies the actuating current to the actuator A (32) in synchronism with a signal issued from the cam phase detecting device C immediately thereafter. In this case, if said signal from the cam phase detecting device C is issued immediately after the end of the cam lift, as the plunger 34 of the actuator 32 is pulled in a direction shown by an arrow in FIG. 2-a simultaneously with receipt of said actuating current, the stopper 26 rotates and the channels 28 of the stopper 26 and the projections 24 of the plunger 20 are opposed and engageable to each other, thereby making the plunger 20 free of sliding motion. Even if any cam lift may follow, as the plunger 20 slides, the poppet valve 12 maintains its closed state and the operation thereof is stopped. On the other hand, if said signal from the cam phase detecting device C is issued during the cam lift, the actuator 32 is supplied with the actuating current, but the spring load of the valve spring imposed on the stopper 26 prevents the movement of the plunger 34 in the direction shown by the arrow and the plunger 34 cannot be operated to rotate the stopper 26. The plunger is operated immediately after the end of cam lift when the spring load is lessened.

When the valve operating signal is generated by the valve controlling means V to commence the operation of the poppet valve 12 which is in stopped state, the synchronizing device S interrupts suply of the actuating current to the actuator A (32) in synchronism with the signal issued from the cam phase detecting device C immediately thereafter. Then, the plunger 34 is forced out in the direction shown by an arrow in FIG. 3-b by a force of a spring (not shown) provided in the actuator 32, thereby rotating the stopper 26. At this time, if said signal from the cam phase detecting device C is issued immediately after the end of the cam lift, the plunger 34 is pushed out simultaneously with the interruption of the actuating current. On the other hand, if said signal is issued during the cam lift, as the channels 28 of the stopper 26 and the projections 24 of the plunger 20, and the wall portions 40 of the stopper 26 and the spaces 22 of the plunger 20 are resectively engaged to each other, the plunger 34 is pushed not when the plunger 20 is slided downward by action of the spring 36 to release said engagement immediately after the cam lift ends. As a result, the lower ends of the wall portions 40 of the stopper 26 and the upper ends of the projections 24 of the plunger 20 abut with each other, and as the plunger 20 is prevented its sliding motion at the next cam lift, the poppet valve 12 is opened.

As clear from the above description, in the first embodiment, as the plunger 20 and the stopper 26 are engaged and disengaged always immediately after the cam lift ends and said engagement and disengagement are perfectly carried out before the next cam lift begins, any breakage of the plunger 20 and the stopper 26 and generation of noise, which may occur when the valve operation is carried out at imperfect engaged or disengaged states, can be avoided.

A second embodiment of the mechanism will be explained with reference to FIGS. 4-a to 4-d. The elements similar to or of similar function to those in said first embodiment are designated by the same numerals and explanation thereof is omitted.

On the end of the stem of the poppet valve 12 is rotatably fitted a stopper 48 which consists of a bottomed cylindrical body 42 and a plurality of projections 46 provided thereon with spaces 44 at equal intervals with each other. A lever 50 is secured to one of said projections 44 and extends radially from the body 42. A plunger 52 fitted on the body 42 of the stopper 48 is of a bottomed cylindrical configuration as shown in FIG. 4-c and formed along the periphery of its cylindrical wall at equal intervals with channels 54 in which said projections are engageable. Wall portions 56 between the channels 54 are engageable in the spaces 44 and the bottom end abuts on one end of the rocker arm 10. The spring 36 is interposed between the stopper 48 and plunger 52. The lever 50 is bent at its center in nearly a rectangle and at its end engaged with one end of a link 60 rotatably supported by a pivot 58. The other end of the link 60 is engaged with the plunger 34 of the actuator 32. The rocker arm 10 is pivotally supported at its other end and at its upper center abuts on the valve actuating cam 14, thereby causing a rocking movement of the rocker arm.

In operation, when sliding motion of the plunger 34 of the actuator 32 is transmitted to the lever 50 via the link 60 to rotate the stopper 48, the spaces 44 of the stopper 48 and the wall portions 56 of the plunger 52, and the projections 46 of the stopper 48 and the channels 54 of the plunger 52 are respectively opposed and become engageable to each other, and therefore the plunger 52 becomes slidable with respect to the stopper 48 thereby stopping the operation of the poppet valve 12. When the upper surfaces of the projections 46 of the stopper 48 and the lower surfaces of the wall portions 56 of the plunger 52 are opposed and abut with each other, sliding motion of the plunger 52 is prevented thereby operating the poppet 12. Therefore, by connecting the actuator 32 shown in said construction to the controller shown in FIG. 1, the operational effect similar to that in said first embodiment can be obtained.

Further, the timing of rotation of said stopper 48 is the same as that in said first embodiment.

A third embodiment of the mechanism will be explained with reference to FIGS. 5-a to 5-d. In this embodiment, the actuator is of a hydraulically operated type, and the actuator, plunger, stopper and controlling means for operating said actuator in response to the phases of the valve actuating cam are assembled in the rocker arm and a support member therefor. The rocker arm 10 is pivoted swingably on a rocker shaft 64 provided with an oil passage 62 extending in the axial direction. A cylinder 68 is fitted in the end of one arm 66 extending rightward in the drawing, and the end of the other arm (not shown) extending leftward abuts on the valve actuating cam (not shown). The rocker arm 10 is mounted with a switching valve which comprises a spool valve 72 slidable in a cylinder 70 formed in the rocker arm 10 and a spring 74 urging the valve 72 toward leftward in the drawing and a hydraulic actuator 82 which comprises a cylinder 78 formed in the rocker arm 10 and a piston 80 slidable in the cylinder 78. The cylinder 70 is communicated with an oil passage 86 always communicating with a radial oil supply passage 84 provided in the rocker shaft 64 regardless of the swinging motion of the rocker arm, an oil passage 90 communicating with a signal oil passage 88 provided in the rocker shaft 64 when the rocker arm 10 is swung by the cam in the clockwise direction in the drawing and the swing by the cam lift becomes the maximum or near, an oil passage 92 communicating with inside of the cylinder 78, an oil passage 96 communicating with the cylinder 78 through the oil passage 92 and provided with a check valve 94 allowing oil to flow only toward the cylinder 78 and an oil exhaust passage 98. The spool valve 72 is formed with three lands 100, 102 and 104 and is urged rightward in the drawing by an oil pressure supplied from the oil passage 90 and urged leftward in the drawing by a force of the spring 74. When the spool valve 72 is in the right position in the drawing, the oil passage 86 and the oil passage 96, and the oil passage 90 and the oil passage 92 are respectively communicated with each other, and the oil exhaust passage 98 is interrupted from each oil passage. When the spool valve is in the left position, the oil passage 96 is closed by the land 104, and the oil passage 92 and the oil exhaust passage 98 are communicated.

A bottom cylindrical plunger 106 is slidably mounted in the cylinder 68, and the upper end of the stem of the poppet valve 12 abuts on the bottom end of the plunger 106. A bottom cylindrical stopper 108 is rotatably mounted in the cylinder 68 above the plunger 106. Channels 110 and 112 are formed and equally spaced circumferentially in the upper half of the cylindrical wall of the plunger 106 and the cylindrical wall of the stopper 108, so that the wall portions 114 between the channels 110 in the plunger 106 are engageable to the channels 112 of the stopper 108 and the wall portions 116 between the channels 112 of the stopper 108 are engageable to the channels 110 of the plunger 106 respectively. A spring 118 is interposed between the plunger 106 and the stopper 108, and the bottom end of the stopper 108 abuts on the lower end of an adjust screw 122 threaded in the upper end of the cylinder 68 and secured by a lock nut 120. As shown in FIG. 5-d, one of the wall portions 116 of the stopper 108 is secured to one end of a lever 126 extending through an elongate slot 124 provided along the periphery of the cylinder 68, and the other outer end of the lever 126 is connected to the piston 80 of the actuator 82 by menas of a link 128. Also, to the outer end of the lever 126 at the connection with the link 128 is secured one end of a return spring 130 for urging the stopper 108 to rotate in the anticlockwise direction in FIG. 5-d through the lever 126 so as to move the piston 80 leftward in FIG. 5-a through the link 128. The other end of said return spring is fixed to the rocker arm 10. Further, the plunger 106 is slidable in the axial direction but prevented its rotation by an outside stop means 132, as shown in FIG. 5-c.

In operation, supply and discharge of oil pressure into and out of the actuator 82 through the oil passage 62 and the switching valve 76 is controlled according to the driving condition of the engine by the valve controlling means provided in the another oil passage (not shown) which is communicated with the oil passage 62 at the end of the rocker shaft 64. When the oil pressure is supplied to the actuator 82 to move the piston 80 in the rightward direction in FIG. 5-a against the force of the return spring 130, the stopper 108 is rotated in the clockwise direction in FIG. 5-d, and the lower end surfaces, the wall portions 116 of the stopper 108 are opposed and abut on the upper end surfaces of the wall portions 114 of the plunger 106, thereby preventing the upward and downward sliding motion of the plunger 106. When the oil pressure is discharged from the actuator 82, the stopper 108 and the piston 80 are moved in the reverse direction by the force of the return spring 130. The channels 112 of the stopper 108 and the wall portions 114 of the plunger 106, and the wall portions 116 of the stopper 108 and the channels 110 of the plunger 106 respectively become engageable with each other, thereby making the plunger 106 free of sliding motion.

In the state shown in FIG. 5-a, the wall portions 114 and 116 of the plunger 106 and the stopper 108 respectively abut with each other to prevent the sliding motion of the plunger and the poppet valve 12 is operated according to the swinging motion of the rocker arm 10 (where the cam lift of valve actuating cam is nearly at maximum), and the oil pressure from the oil passage 62 is supplied into the actuator 82 to move the piston 80 and the spool valve 72 to the rightside position in the drawing. From this state, when the oil pressure within the oil passage 62 is discharged by said valve controlling means in order to stop the operation of the poppet valve 12 by enabling the sliding motion of the plunger 106 according to the driving condition of the engine, regardless of the phase of valve actuating cam, the oil pressure in the cylinder 78 is discharged accordingly, and the piston 80 is moved leftward by the force of the return spring 130 concurrently rotating the stopper 108. Thus the plunger 106 becomes slidable as abovementioned and the operation of the poppet valve 12 is stopped. However, if the discharge of oil pressure from said oil passage 62 is initiated during the term when no cam lift exists, that is, during the rocker arm 10 is swung in the anticlockwise direction in FIG. 5-a to interrupt the communication between the signal oil passage 88 and the oil passage 90 and to close the oil passage 90 by the outer surface of the rocker shaft 64, while maintaining the communication between the oil supply passage 84 and the oil passage 86, the discharge of the oil pressure from the cylinder 78 and the rotation of the stopper 108 are carried out in the following manner.

When the oil pressure in the oil passage 62 is discharged during the time as abovementioned where no cam lift exists, the oil pressures in the oil supply passage 84, oil passage 86 and signal oil passage 88 are discharged simultaneously. However, the oil pressure in the cylinder 78 is not discharged as the oil passage 90 is closed by the outer surface of the rocker shaft 64 and further as the check valve 94 is provided in the oil passage 96, thereby maintaining the similar state as when the oil pressure is supplied in the oil passage 62. In the next, when the cam lift begins and the oil passage 90 and the signal oil passage 88 are communicated, the oil pressure acting on the left end surface of the land 100 of the spool valve 72 to urge the spool valve rightward in the drawing is discharged through the oil passage 90, signal oil passage 88 and oil passage 62. As the spool valve 72 is urged leftward by the force of the spring 74, the oil passage 92 and the oil exhaust passage 98 are communicated with each other to discharge the oil pressure in the cylinder 78 through the oil passages 92 and 98, and the force of the return spring 130 tends to move the piston 80 leftward and to rotate the stopper 108. At this time, however, as the cam lift is still maintained and the rocker arm 10 is swung in the clockwise direction in the drawing, a force of the valve spring (not shown) for the poppet valve 12 acts on the stopper 108 through the plunger 106, thereby preventing rotation of the stopper 108. When said cam lift ends, as the force of said valve spring acting on the stopper 108 is lessened, the stopper 108 can be rotated by the biasing force of the return spring 130, and the channels 110 of the plunger 106 and the wall portions 116 of the stopper 108, and the wall portions 114 and the channels 112 are respectively opposed and engageable to each other. As a result, as the plunger 106 is slidable, even if the next cam lift begins to swing the rocker arm 10 in the clockwise direction, said plunger 106 slides and the operation of the poppet valve 12 is stopped.

With regard to the supply of the oil pressure into the oil passage 62 by said valve controlling means in order to let the poppet valve 12 operate from said stopped state of valve operation, according to the driving condition of the engine, if the oil pressure is supplied during no cam lift exists, the oil pressure is supplied to the oil passage 62 as well as to the oil supply passage 84, the oil passage 86 and signal oil passage 88 simultaneously. However, as the communication between the signal oil passage 88 and the oil passage 90 is interrupted and the oil passage 96 is closed by the land 104, the oil pressure is not supplied to cylinder 78 at this time. In the next, when the cam lift begins and the rocker arm 10 is swung to communicate the signal oil passage 88 with the oil passage 90, as the oil pressure is supplied to the left end surface of the land 100 of the spool valve 72 through the oil passage 90, the spool valve is moved rightward by said oil pressure against the force of the spring 74, and the oil passages 90 and 92 and the oil passages 86 and 96 are respectively communicated with each other to supply the oil pressure into the cylinder 78. There is a tendency that the piston 80 moves rightward and the stopper 108 is rotated in the direction reverse to the abovementioned. However, at this time, as the cam lift still exists and the rocker arm 10 is still swung, the channels 110 of the plunger 106 and the wall portions 116 of the stopper 108, and the wall portions 114 and the channels 112 are respectively engaged with each other, thereby preventing the rightward movement of the piston 80 and the rotation of the stopper 108. Then, as said cam lift is lessened, the rocker arm 10 is gradually swung in the anticlockwise direction. When the cam lift ends, the plunger 106 and the stopper 108 are disengaged from each other, so that the stopper 108 can be rotated by the rightward movement of the piston 80 by the oil pressure and the upper end surfaces of the wall portions 114 and the lower end surfaces of the wall portions 116 are opposed and abut. As a result, the plunger 106 is stopped of its sliding motion, and when the next cam lift begins to swung the rocker arm 10, the poppet valve 12 is operated.

Further, if said supply and discharge of the oil pressure by said valve controlling means is carried out when the signal oil passage 88 and the oil passage 90 are communicated with each other during the cam lift, the stopper 108 will be rotated as described in the above explanation of operation in the order after the oil passages 88 and 90 are communicated.

As clear from the above description, in the third embodiment, as the engagement and disengagement of the stopper 108 with the plunger 106 to let the plunger 106 slide or stop in order to stop or operate the poppet valve 12 is commenced immediately after the cam lift ends, in synchronism with the phase of the valve actuating cam, said engagement and disengagement operation can be completely finished during the time until the next cam lift begins, and thus any occurrence of breakage and noise can be avoided.

A fourth embodiment of the mechanism will be explained with reference to FIGS. 6-a and 6-b. The elements similar to or of similar function to those in said third embodiment are designated by the same numerals and the detailed explanation thereof is omitted.

The bottomed cylindrical plunger 106 is slidably mounted in the cylinder 68 fitted in the rocker arm 10 and urged downwardly in FIG. 6-b by the spring 118 provided therein having its bottom end abutted to the end of the stem of the poppet valve 12. A pair of slots 134 are oppositely provided in the peripheral wall of the cylinder 68 at the location where they will be over the upper end of the plunger 106 when the plunger takes the lowest position (as shown) in relation to the cylinder 68. A stopper 136 having a forked right part is adapted to be inserted into the slots 134. The forked part of the stopper 136 is formed so that the distance between its inner edges at the left end is substantially equal to the inner diameter of the plunger 106 and at the right end is a little wider than the outer diameter of the plunger 106. A pair of legs are extended from the left part of the stopper 136 in substantially parallel relation and crooked to form a reversed U shape as shown in FIG. 6-b. On the upper outer periphery of the cylinder 68 is formed a thread on which a double nut 138 is threaded to act as a guide means for guiding the upper surface of the stopper 136 to let the stopper slide smoothly. A spring 140 is interposed between the stopper 136 and the rocker arm 10 to prevent vertical vibration of the stopper 136. As in the third embodiment, the hydraulic actuator 82 comprising the cylinder 78, the piston 80 slidable in the cylinder 78 and a return spring 142 urging the piston 80 in the leftward direction in FIG. 6-b is mounted in the rocker arm 10. One end of a rod 144 is secured to the piston 80 and the other outer end of the rod 144 is secured to a coupling member 146 in the form of a substantially H shape as shown in FIG. 6-a. The legs of the reversed U shape of the stopper 136 are inserted into each open legs of the coupling member 146 with a clearance 148 along the sliding direction of the piston 80 and the stopper 136, thereby connecting between said stopper 136 and said rod 144 and piston 80 with the clearance 148.

The piston 80 is provided in the middle portion of its cylindrical wall with a notch 150. One end of a timing plate 156 is inserted into a bore 152 provided in the rocker arm 10 underneath the actuator 82 and bent substantially in a rectangle as shown in FIG. 6-b and the other end is secured to the rocker arm 10 by a screw 154. When the piston 50 takes the rightside position in FIG. 6-b, said one end of the timing plate 156 is engaged in the notch 150. Said one end of the timing plate 156 is also carried by a guide member 158 slidably in the vertical direction in FIG. 6-b. Further, said timing plate 156 has a resiliency to urge said one end downwardly in FIG. 6-b and is adapted to be pushed by a spherical timing cam follower 160 from underside. The timing cam follower 160 follows, in accordance with the swinging motion of the rocker arm 10, a timing cam 162 which is formed by cutting off a portion of the outer periphery of the rocker shaft 64 in the circumferential direction. When the swinging motion of the rocker arm 10 is at the maximum or near thereto, that is when the cam lift is at maximum or near thereto, as the timing cam 162 slides largely toward the center of the rocker shaft 64, said one end of the timing plate 156 is moved downward by its own resiliency and disengaged from the notch 150 of the piston 80.

The cylinder 78 of the actuator 82 is always in communication with the oil passage 62 through an oil passage 164 and the oil supply passage 84, regardless of the swinging motion of the rocker arm 10.

The operation of the abovedescribed mechanism will be explained with reference to FIGS. 6-c to 6-j. These figures are shown substantially compared to FIGS. 6-a and 6-b, in order to make understanding of the operational principles easier.

FIG. 6-c shows the operation state in which the oil pressure is not supplied to the actuator 82, and the piston 80 is positioned in the leftside by the force of the return spring 142. In this state, the plunger 106 and the stopper 136 are disengaged, and the plunger 106 is slidable so that the operation of the poppet valve 12 is stopped. Also the timing plate 156 and the right end of the piston 80 are engaged.

Now, if the oil pressure is supplied to the actuator 82 by the valve controlling means through the oil passages 62 and 164, according to the driving condition of the engine, the piston 80 is urged rightward by said oil pressure. However, as shown in FIG. 6-d, during the time where no cam lift exists, as the timing plate 156 is engaged with the right end of the piston 80, the piston cannot slide rightward. In the next, as shown in FIG. 6-e, when the cam lift begins and becomes to the maximum or near thereto, the rocker arm 10 swings and as the timing cam follower 160 slides largely towards the center of the rocker shaft 64 following the timing cam 162, the timing plate 156 moves downward by its resiliency and is disengaged from the right end of the piston 80 so that the piston is moved rightward by the oil pressure. In this state, as the rocker arm 10 swings and the plunger 106 is moved inward of the cylinder 68, the stopper 136 abuts on the cylindrical wall of the plunger 106 and cannot slide. Hence, the piston 80 slides only a distance corresponding to the clearance 148 defined in the connecting portion to the stopper 136 and takes a position where the right end of the piston 80 and the timing plate 156 do not engage with each other. Then, when the cam lift ends, the plunger 106 is slided downward outside of the cylinder 68 by the force of the spring 118. As the upper end of the plunger 106 comes under the slots 135 making the stopper 136 slidable, the stopper 136 enters into the slots 134 in accompany with the rightward movement of the piston 80 by the oil pressure and abuts on the upper end of the plunger 106, thereby preventing the sliding motion of the plunger 106. As a result, when the next cam lift begins to swing the rocker arm 10, the plunger 106 does not slide and the poppet valve 12 is operated.

In this state, when no cam lift exists, the timing plate 156 is engaged in the notch 150 of the piston 80 (FIG. 6-g).

If the oil pressure is discharged from the actuator 82 by said valve controlling means through the oil passages 164 and 62 in order to stop the operation of the poppet valve 12 from the operating state of the valve shown in FIG. 6-g, according to the driving condition of the engine, the piston 80 is urged leftward by the return spring 142. However, during the time when no cam lift exists as shown in FIG. 6-h, as the timing plate 156 is engaged in the notch 150 of the piston 80, the piston 80 cannot slide leftward. When the cam lift begins and becomes to the maximum or near thereto, as the timing plate 156 is disengaged from the notch 150 of the piston 80, the piston is moved leftward by the force of the return spring 142. In this state, as the rocker arm 10 swings to operate the poppet valve 12 before said disengagement of the timing plate, the stopper 136 is clamped between the upper end of the plunger 106 and the upper surfaces of the slots 134 by the load of the valve spring and cannot slide. Hence, the piston 80 slides only a distance corresponding to the clearance 148 defined in the connection portion to the stopper 136 and takes the position where the notch 150 and the timing plate 156 do not engage with each other. When the cam lift ends, the stopper 136 becomes slidable by release of said load of the valve spring and disengaged from the slots 134 in accompany with the leftward movement of the piston 80 by the return spring 142, thereby making the plunger 106 slidable. As a result, even if the next cam lift begins to swing the rocker arm 10, as the plunger 106 slides, the poppet valve 12 is not operated.

As clear from the above description, in the fourth embodiment, by the provision of the clearance 148 in the connecting portion of the piston 80 and the stopper 136 and of the timing plate 156 engageable and disengageable with the right end of the piston 80 and with the notch 150 in the middle portion thereof according to the phase of the valve actuating cam (the swinging motion of the rocker arm 10), the engagement and disengagement of the plunger 106 and the stopper 136 for operating or stopping the poppet valve 12 is commenced immediately after the cam lift ends, in synchronism with the phase of the valve actuating cam, and so said engaging and disengaging operation are finished completely before the next cam lift occurs. Thus, there will never happen that the next cam lift will occur while the engagement of disengagement of the plunger 106 with the stopper 136 are not completed, thus preventing any breakage of the plunger 106 and the stopper 136 and generation of noise.

A fifth embodiment of the mechanism will be explained with reference to FIGS. 7-a to 7-c. In this embodiment, the construction of timing plate and the construction of the connection between the piston and the stopper are somewhat changed from those in the said embodiment. The elements similar to or of similar function to those in the said fourth embodiment are designated by the same numerals and the detailed explanation thereof is omitted.

The timing cam 162 provided in the rocker shaft 64 is arranged so that when the swinging motion of the rocker arm 10 comes to the maximum or near thereto, that is when the cam lift is at maximum or near thereto, the timing cam follower 160 of a substantially columnar configuration is largely slided radially outward of the rocker shaft 64. The timing plate 156 is rotatably pivoted on a shaft 166 mounted on the rocker arm 10 and is slidable within the groove 168 provided in the outer upper part of the cylinder 78 to engage with the left end of the piston 80 and the notch 150 provided in the upper middle portion thereof. Said timing plate 156 is urged by a spring 170 in the direction of engagement with the piston (in the clockwise direction in FIG. 7-c). When the timing cam follower 160 is pushed upward in FIG. 7-c by the timing cam 162, the timing plate 156 is rotated in the anticlockwise direction by the timing cam follower 160 to be disengaged from the piston 80.

On the outer end of the rod 144 mounted on the piston 80 is secured the tubular connecting member 146 having a square section in the plane perpendicular to the sliding direction of the piston 80, and a hook portion of a substantially C shape provided on the side of the stopper 136 facing to the piston 80 surrounds the connecting member 146 with the clearance 148 along the sliding direction of the piston, thereby connecting said stopper 136 and said rod 144 and piston 80 with the clearance 148.

In this embodiment, the operation of the mechanism is similar to that of said fourth embodiment, except that the operative direction of the timing cam follower 160 operated in response to the swinging motion of the rocker arm 10 become reverse depending on a difference in the direction of the engagement of the piston 80 with the timing plate 156 whether it is made from lower side of the piston 80 or from upper side of the piston 80. Thus, the operational effect of this embodiment is quite similar to that of the fourth embodiment.

A sixth embodiment of the mechanism will be explained with reference to the FIGS. 8-a to 8-c. This sixth embodiment is different from said third to fifth embodiments in that the plunger 106 is mounted on an arm 172 of the rocker arm 10 extending toward the cam 14 and the actuating mechanism of the timing plate 156 is somewhat changed accordingly. The basic operation thereof is almost similar to that of said fourth and fifth embodiments. The elements similar to or of similar function to those in each of said embodiments are designated by the same numerals and the detailed explanation thereof is omitted.

An adjust screw 176 is threaded on the end of the arm 66 of the rocker arm 10 extending toward the poppet valve 12 secured by a lock nut 174. The end of the stem of the poppet valve 12 abuts on the adjust screw 176. The bottomed cylindrical plunger 106 slidable in the cylinder 68 inserted in said arm 172 is downwardly urged by the spring 118 interposed between the plunger 106 and a spring retainer 180 which is secured to the cylinder 68 by a screw 178, and the bottom end of the plunger 106 abuts on the valve actuating cam (not shown). The cylinder 68 and the plunger 106 are prevented from rotation relative to the arm 172 by a key 186 which extends through the cylindrical wall of the cylinder 68 into slots 182 and 184 formed respectively in the arm 172 and the plunger 106. The stopper 136 is connected to the rod 144 with the clearance 148 along the sliding direction of said rod, by engagement of a pin 188 secured to the rod 144 of the actuator 82 with an elongate slot 190 drilled in the stopper 136.

The timing plate 156 is pivoted at one end on a pivot provided through the rocker arm 10 at one side thereof and is formed at the other end with an engaging portion 196 which is bent substantially rectangularly, and extends into a slot 194 formed axially in the plunger 106. At about the middle portion of the timing plate 156 is formed another engaging portion 198 which extends above the rod 144 and is engageable with the notch 150 provided therein and the right end in the drawing of said rod, and under said middle portion is a projection 160' forming the timing cam follower. The engaging portion 196 is arranged so that during the plunger 106 is sliding in the cylinder 68 (when the operation of the poppet valve 12 is stopped and the swinging motion of the rocker arm 10 is also stopped), if the cam lift becomes to the maximum or near thereto (the plunger 106 slides to the uppermost or near thereto in the drawing), the engaging portion 196 is engaged with the lowest edge of the slot 194 to be moved upward and to swing the timing plate 156 in the anticlockwise direction in the drawing, thereby releasing the engagement of the engaging portion 198 and the rod 144. The engaging portion 198 is arranged so that when the piston 80 is positioned in the rightmost position as shown in FIGS. 8-a and 8-b with the supply of the oil pressure to the actuator 82, the engaging portion 198 engages in the notch 150 of the rod 144 and when the piston 80 is moved to the leftmost position by discharge of the oil pressure, it engages with the right end of the rod 144.

A leaf spring 200 is secured at its one end to the cylinder 68 by the screw 178 and the other end thereof abuts on the engaging portion 198 of the timing plate 156 to urge said portion downward and the timing plate 156 in the clockwise direction and to contact the projection 160' with the timing cam 162 as well. Further, said one end of the leaf spring 200 is provided with extensions 202 extending downward along the cylinder 68. The lowest end of each extension 202 is bent substantially in a rectangle into the slot 134 of the cylinder 68 to engage with the lower surface of the stopper 136 and pushes it upward, thereby preventing vibration thereof in the vertical direction.

According to the above construction, during the operation of the poppet valve 12 where the stopper 136 is engaged with the upper surface of the plunger 106 to prevent the sliding motin of the plunger 106, as the rocker arm 10 is swung in response to the rotation of the valve actuating cam, similar to said fourth and fifth embodiments, the engagement of the engaging portion 198 with the notch 150 is released by cooperation of the projection 160' of the timing plate 156 and the timing cam 162 when the cam lift is at maximum or near thereto, whereby the engagement of the stopper 136 with the plunger 106 is released to let the plunger 106 slide. During the operation of the poppet valve 12 is stopped, though the swinging motion of the rocker arm 10 is stopped with only sliding motion of the plunger 106, the engagement of the engaging portion 198 with the right end of the rod 144 is released by the engagement of the lowest edge of the slot 194 of the plunger 106 with the engaging portion 196 when the cam lift is at maximum or near thereto as abovementioned.

Therefore, in the sixth embodiment, the similar operational effects to those in the fourth and fifth embodiments can be obtained. In addition, there are advantages in that during the operation of the poppet valve 12 is stopped, as only the plunger 106 is operated and the swinging motion of the rocker arm 10 is suspended, the force of the spring 118 may be set at an extent equivalent to the weight of the plunger 106 and the size and weight of the spring 118 per se can be made smaller and lighter compared with the construction of said third to fifth embodiments where the force of the spring 118 must be made stronger corresponding to the weight of the rocker arm 10 as the rocker arm 10 swings even during the poppet valve is stopped. As a result, the bouncing frequency of the plunger 106 increases, thereby preventing bounding in the valve actuating system including the rocker arm in the normal driving range and effectively suppressing generation of any vibration and noise. Further, as the conventional adjust screw 176 and lock nut 174 are provided in the abutment between the poppet valve and the rocker arm 10, namely the arm 66, independently of the mechanism for stopping the operation of the valve adjustment of the valve clearance can be carried out very easily.

In said third to sixth embodiments, the actuator is designed so that when the oil pressure is discharged from the actuator 82, the poppet valve is stopped of its operation. However, particularly in the fourth to sixth embodiments, the stopper of a construction as shown in FIG. 9 may be effectively used. In more detail, the stopper 206 is formed with a hole 202 which has a diameter slightly larger than the outer diameter of the plunger 106 and confronts with the plunger 106 when the rod 144 is projected by supply of the oil pressure to the actuator 82, and with parallel wall portions 204 which are separated by a distance substantially equal to the inner diameter of the plunger 106 and confront with the plunger 106 when the oil pressure is discharged from the actuator 82 and the rod 144 is retracted by the force of the spring 142. By the use of this stopper 206, the operation of the poppet valve 12 is stopped when the oil pressure is supplied to the actuator 82 and the poppet valve 12 is operated when the oil pressure is discharged from the actuator 82. Accordingly, if the mechanism of this design is applied to the intake and exhaust valves of the internal combustion engine, all the intake and exhaust valves can be operated even at the starting of the engine when sufficient oil pressure cannot be produced, thereby operating all the cylinders and maintaining good starting of the engine. Similar operational effects can be obtained in the above each embodiment if the direction of action of the oil pressure on the piston 80 and the direction of action of the spring 142 thereon are made reverse to each other, that is, for instance in FIG. 8-a showing the sixth embodiment, if the oil pressure is supplied to the right side of the piston 80 and the spring 42 is disposed left side of the piston 80.

As above described in detail, according to the present invention, in the sliding and stopping operation of the plunger provided in a part of valve actuating system for driving the poppet valve, as the actuator for driving the stopper which is engageable and disengageable with said plunger is operated in response to the phase of the valve actuating cam, there will never occur a cam lift and the rocker arm is not swung when the engagement and disengagement of the stopper with the plunger are in incomplete conditions. According to the prior mechanism for stopping operation of the valve, when the signal from the valve controlling means for controlling operation and stop of the poppet valve according to the driving condition of the engine is issued just before the occurrence of the cam lift m, as the issuing time x of said signal and the operation commencing time y of the actuator (stopper) fall in the same timing, the operation of said actuator (stopper) ends at the time z where the cam lift m is over and so the valve is operated under the condition where the engagement of the stopper and the plunger is incomplete, during the time a cam lift m occurs, causing an abnormally high stress on a part of the stopper and the plunger accompanying a fear of breakage. Whereas, according to the present invention, even if the issuing time x of said signal is immediately before the occurrence of the cam lift m, the operation commencing time y of the actuator (stopper) comes after the end of said cam lift m and the operation of the actuator (stopper) ends at the time point z before the occurrence of the next cam lift, thereby completely dissolving said inconveniences experienced in the prior mechanism.

What is claimed is:
1. A mechanism for stopping operation of a valve comprising a plunger slidably mounted in a portion of a valve actuating system for actuating the valve used as an intake valve, an exhaust valve or the like of an internal combustion engine, a stopper engageable and disengageable with said plunger, an actuator for actuating said stopper, said stopper being engaged with said plunger to prevent sliding motion of the plunger thereby operating said valve, said stopper being disengaged from said stopper to allow sliding motion of the plunger thereby stopping the operation of said valve, and controlling means detecting phases of a valve actuating cam for actuating said valve to set commencement of operation of said actuator at the time just after a cam lift by said valve actuating cam ends.

2. A mechanism according to claim 1, wherein said controlling means electrically detects the phase of said valve actuating cam and issues an electrical signal for operating said actuator during the time when a cam lift by said valve actuating cam occurs or immediately after the cam lift ends.

3. A mechanism according to claim 1, wherein said actuator is a hydraulically operated type and comprises a cylinder and a piston, said controlling means operating said actuator to drive said stopper immediately after the cam lift ends.

4. A mechanism according to claim 1, wherein said plunger forms a fulcrum on a rocker arm consisting said portion of the valve actuating system.

5. A mechanism according to claim 1, wherein said stopper comprises a bottomed cylindrical body rotatably fitted on an end of a stem of said valve and projections formed on an outer periphery of the body and equally spaced circumferentially, said plunger comprising a bottomed cylindrical member fitted on said stopper, a tubular wall of which is formed with channels extending along the direction of said stem and mating with said projections and a bottom end of which abuts on one end of a rocker arm consisting said portion of the valve actuating system.

6. A mechanism according to claim 3, wherein said plunger comprises a bottomed cylindrical member slidable within a cylindrical bore formed in the end of a rocker arm extending toward said valve, said rocker arm consisting said portion of the valve actuating system and swinging about a rocker shaft, the hydraulic actuator consisting of said cylinder and piston being mounted in said rocker arm, said rocker shaft being formed with a first oil passage extending in an axial direction of the rocker shaft and a second oil passage extending in a radial direction of the rocker shaft and communicating between said first oil passage and the outer surface of the rocker shaft, said rocker arm being formed with a third oil passage communicating said second oil passage to said actuator.

7. A mechanism according to claim 6, wherein said controlling means comprises a fourth oil passage in said rocker shaft extending in a radial direction thereof and communicating said first oil passage to the outer surface of the rocker shaft, a fifth oil passage formed in said rocker arm and communicating with said fourth oil passage when the cam lift of said valve actuating cam is at near its maximum, and a control valve provided in said second oil passage and operated by supply and discharge of oil pressure into said fifth oil passage for switching the supply and discharge of oil pressure into and from said actuator.

8. A mechanism according to claim 6, wherein said piston of the actuator is connected to said stopper with a predetermined clearance in the sliding direction of said piston, said controlling means comprising a timing plate engageable with said piston to prevent the sliding motion of said piston at two position, one position being when said stopper and plunger are disengaged and the other position being when said stopper and plunger are engaged with each other, and a timing cam follower following a contour of a timing cam formed on the outer surface of said rocker shaft to actuate said timing plate in accordance with the swinging motion of said rocker arm, the engagement of said timing plate with said piston being released when the cam lift of said valve actuating cam is at near its maximum.

9. A mechanism according to claim 3, wherein said plunger comprises a bottomed cylindrical member slidable within the cylindrical bore formed in the end of a rocker arm extending toward said valve actuating cam, said rocker arm consisting said portion of the valve actuating system and swinging about a rocker shaft, the hydraulic actuator consisting of said cylinder and piston being mounted in said rocker arm, said rocker shaft being formed with a first oil passage extending in an axial direction of the rocker shaft and a second oil passage extending in a radial direction of the rocker shaft and communicating between said first oil passage and the outer surface of the rocker shaft, said rocker arm being formed with a third oil passage communicating said second oil passage to said actuator.

10. A mechanism according to claim 9, wherein said piston of the actuator is connected to said stopper with a predetermined clearance in the sliding direction of said piston, said controlling means comprising a timing plate engageable with said piston to prevent the sliding motion of said piston at two positions, one position being when said stopper and plunger are disengaged and the other position being when said stopper and plunger are engaged with each other, a timing cam follower following a contour of a timing cam formed on the outer surface of said rocker shaft to actuate said timing plate in accordance with the swinging motion of said rocker arm, and an engaging portion engageable with a slot formed in the outer wall surface of said plunger along the sliding direction thereof to actuate said timing plate in accordance with the sliding motion of said plunger, the engagement of said timing plate with said piston being released by action of said timing cam follower or of said engaging portion when the cam lift of said valve actuating cam is at near its maximum.

11. A mechanism according to claim 3, wherein said plunger and said stopper are engaged with each other when the oil pressure is supplied to said actuator and disengaged when the oil pressure is discharged from said actuator.

12. A mechanism according to claim 3, wherein said plunger and said stopper are disengaged when the oil pressure is supplied to said actuator and engaged with each other when the oil pressure is discharged from said actuator.

* * * * *

UNITED STATES PATENT AND TRADEMARK OFFICE
CERTIFICATE OF CORRECTION

PATENT NO. : 4,387,680
DATED : Jun. 14, 1983
INVENTOR(S) : Katashi Tsunetomi, et al It is certified that error appears in the above-identified patent and that said Letters Patent is hereby corrected as shown below:

On the title page the following should be added:

-- [73] Assignee: Mitsubishi Jidosha Kogyo Kabushiki Kaisha --.

Signed and Sealed this

Eleventh Day of June 1985

[SEAL]

Attest:

DONALD J. QUIGG

Attesting Officer     Acting Commissioner of Patents and Trademarks